Nov. 6, 1923.　　　　　　　　　　　　　　　　　　　1,472,895
J. WEGNER
CUTTING MACHINE
Filed March 12, 1921　　　　5 Sheets-Sheet 1

WITNESSES　　　　　　　　　　　　　　　　　　INVENTOR
　　　　　　　　　　　　　　　　　　　　　　Julius Wegner
　　　　　　　　　　　　　　　　　　　　　　　BY
　　　　　　　　　　　　　　　　　　　　　　　　　ATTORNEYS Nov. 6, 1923.

J. WEGNER

CUTTING MACHINE

Filed March 12, 1921

J. WEGNER 1,472,895

CUTTING MACHINE

Filed March 12, 1921   5 Sheets-Sheet 5

Patented Nov. 6, 1923.

1,472,895

UNITED STATES PATENT OFFICE.

JULIUS WEGNER, OF NEW YORK, N. Y., ASSIGNOR, BY MESNE ASSIGNMENTS, TO SPADONE MACHINE COMPANY, INC., OF NEW YORK, N. Y., A CORPORATION OF NEW YORK.

CUTTING MACHINE.

Application filed March 12, 1921. Serial No. 451,856.

*To all whom it may concern:*

Be it known that I, JULIUS WEGNER, a citizen of the United States, and resident of the borough and county of Queens, city and State of New York, have invented certain new and useful Improvements in Cutting Machines, of which the following is a specification.

My invention relates to fabric cutting machines and more particularly to machines for the cutting of frictioned duck used in the manufacture of tires, hose and the like into sections of the desired dimensions and has for its object to provide such machines with an automatic take-off whereby the sections of fabric are automatically removed from the machine. Another object of my invention is the provision of a novel and efficient means whereby the sections of fabric are received from the take-off and stacked, booked, rolled up or otherwise disposed of. The invention will be fully described hereinafter and the features of novelty will be pointed out in the appended claims.

In the accompanying drawings which show an example of the invention without defining its limits.

It will be understood that the invention is intended for operative combination with cutting machines of the type shown in patent to Bolton No. 942,164 of December 7, 1909 and that only so much of a cutting machine as is necessary to illustrate the invention is included in the drawings.

As shown in said drawings, 15 represents a raceway which may be stationary or mounted upon a suitable portion of the machine frame so as to be adjustable to different angles of inclination relatively thereto. A cover 16 is secured upon the raceway 15 and forms therewith a slot 17 extending lengthwise of said raceway and located in registry with the longitudinal groove 18 of a clamp bar 19 slidably mounted in a support 20 carried by brackets 21 fastened in any convenient manner to the raceway 15, said clamp bar 19 being actuated in operative harmony with the remainder of the cutting machine by suitable mechanism. The raceway is provided with a lengthwise extending and preferably undercut guideway 22 in which a cutting device 23 is reciprocated by suitable mechanism, said cutting device including a knife 24 which is automatically projected through the slot 17 in a cutting position during the travel of the cutting device 23 in one direction and is automatically withdrawn to an inoperative position during the travel of said device 23 in the opposite direction. The parts so far described may be of any suitable construction and may be actuated in any convenient manner, it being understood that the complete machine includes also a feeding mechanism, for instance, of the type included in the Bolton patent hereinbefore referred to and whereby the fabric *a* is intermittently fed downwardly in the space which normally exists between the raceway 15 and the clamp bar 19.

Figures 1, 13:
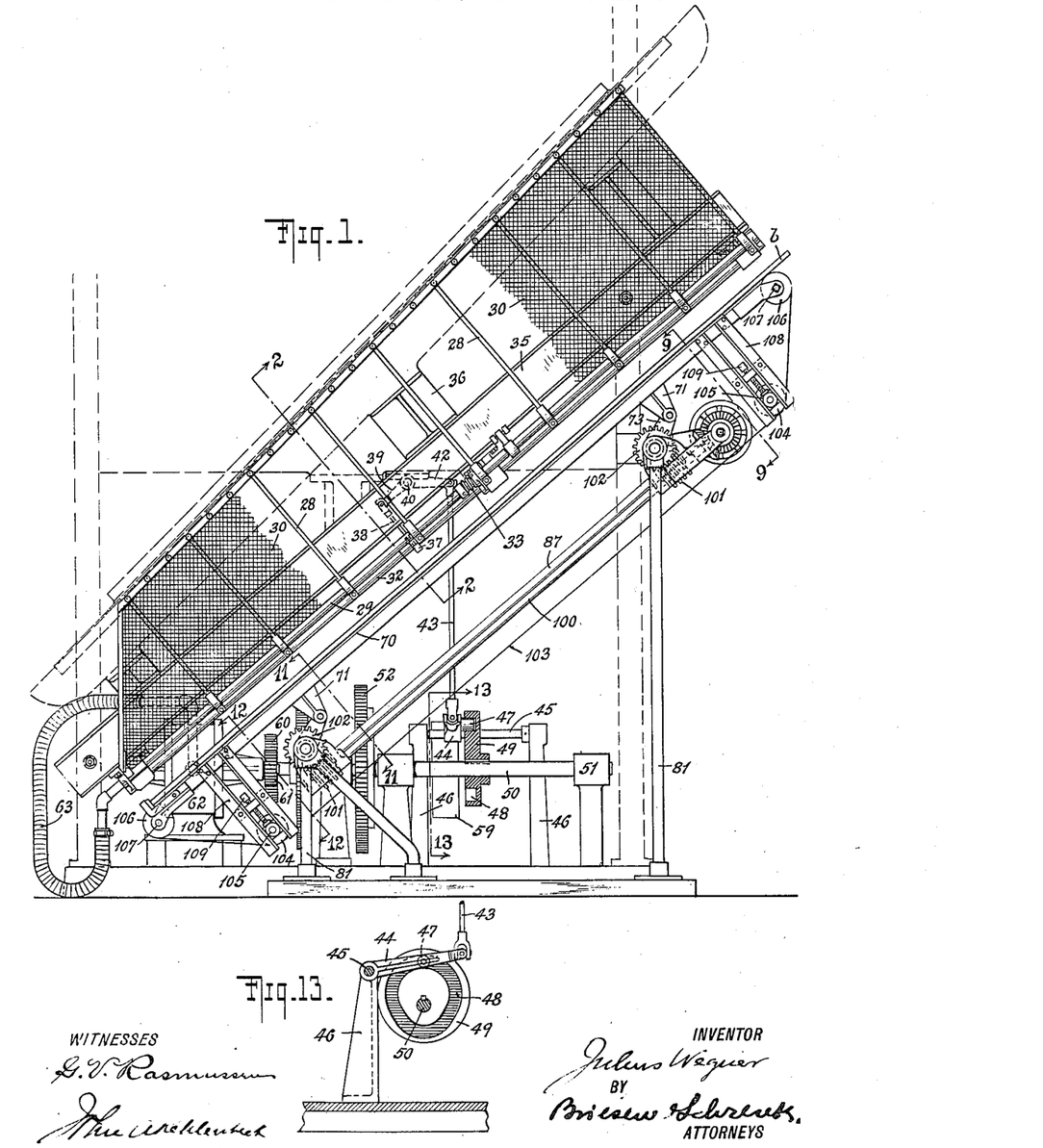
Figure 1 is an elevation of the take-off and the receiving means and as much of the cutting machine as is required to illustrate the operative combination.
Fig. 13 is a detail view of a cam included in the machine.
Figure 2:
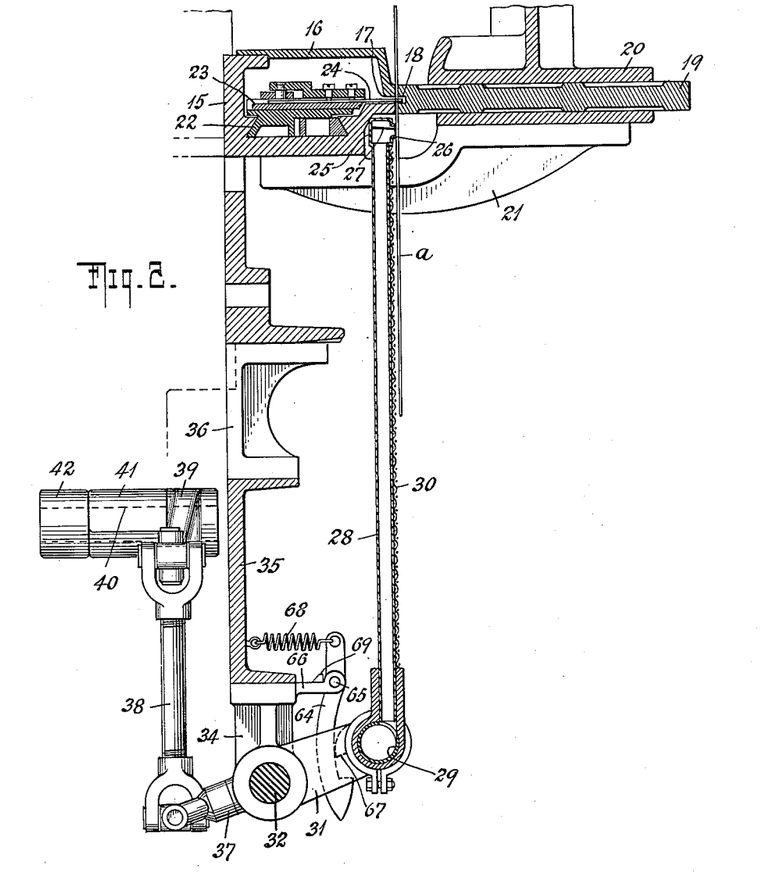
Fig. 2 is a cross-section thereof on an enlarged scale.

The take-off, in its illustrated form, comprises a main tube 25 closed at both ends and provided at spaced intervals throughout its length with suction apertures 26; in the preferred form a series of pins 27 are carried by said tube 25 in registry with and projecting outwardly beyond said apertures 26, preferably at a downward inclination when the take-off is in its normal position, as shown in Fig. 2. The main tube 25 is mounted upon and communicates with a series of branch tubes 28 which, in turn, are connected with and fixed upon a tubular shaft 29, the main tube 25 and branch tubes 28 together constituting a take-off frame pivotally mounted by means of the shaft 29 and which preferably is provided with a wire netting 30 or analogous device for bridging the spaces between the branch tubes 28, as shown in Figs. 1 and 2. The tubular shaft 29 is journalled in members 31, secured to an projecting from a power shaft 32, a coil spring 33 or its equivalent being provided upon the tubular shaft 29 for maintaining said take-off frame in its normal position, as shown in Fig. 2 and for returning it thereto. The power shaft 32 is rotatably mounted in bearings 34 depending from a channel beam 35 or other suitable support, said channel beam 35 being carried by brackets 36 secured to a convenient portion of the raceway 15, as shown in Fig. 2. An arm 37 is fixed upon the power shaft 32 and is connected by means of a link 38 with a lever 39 carried by a pivot shaft 40 journalled in a bearing bracket 41 which is fastened to a suitable part of the machine frame. A second lever 42 also mounted upon the shaft 40 is connected by means of a rod 43 with an arm 44 fixed upon a shaft 45 journalled in stationary bearings 46, said arm 44 carrying a roller 47 which projects into the groove 48 of a cam 49 as shown in Fig. 1. The cam 49 is mounted upon a shaft 50 journalled in bearings 51 and which is rotatably actuated in any convenient manner to cause said cam to function in harmony with the other operative parts of the machine; for instance, said shaft 50 may carry a gear 52 which meshes with a pinion 53 located upon a counter-shaft 54 rotatably mounted in suitable bearings 55. The counter-shaft 54 in turn may be provided with a gear 56 which meshes with a pinion 57 fixed upon the drive shaft of an electric motor 58 or said counter-shaft 54 may carry a pulley 59 for the accommodation of a driving belt whereby rotative power is transmitted. The counter-shaft 54 may further carry a second gear 60 which, through the medium of a pinion 61, actuates a suction or vacuum pump 62 of any suitable type and operatively connected by means of a hose or the like 63 with the hollow shaft 29 and with the tubes 28 and main tube 25; suitable means may be provided for automatically cutting off the connection between the shaft 29 and the pump 62 at the moment when it is desired to release the cut fabric, as will appear more fully hereinafter.

The arrangement further includes a latch 64 pivoted at 65 upon a bracket 66 attached to or forming part of the channel beam 35, said latch being maintained in and returned to its normal position in the path of a lug 67 by means of a spring 68, the lug 67 being fixed upon the tubular shaft 29. A stop 69 may be provided upon the bracket 66 for arresting the movement of said latch in the direction in which the latter is moved by the action of the spring 68. It will be understood that the main tube 25 extends parallel with the cutting slot 17 which in the general operation of the machine extends at an angle of approximately 45°; in the preferred arrangement the hollow shaft 29 and the shaft 32 are arranged at a common inclination the angle of which is somewhat less than that of the tube 25, so that the take-off is constructed in the form shown approximately in Fig. 1, the purpose of this arrangement being more fully brought out hereinafter.

To increase the efficiency of the cutting machine in general and of the take-off in particular, it is preferred to include a means for receiving the cut fabric from the take-off, it being understood that, if desired, this means may be omitted, in which case the cut fabric may simply be taken manually from the take-off. In the illustrated example the receiving means is shown in the form of a table 70 provided with depending brackets 71 pivotally connected by means of rods 72 with arms 73 comprising integral extensions of or fixed upon sleeves 74. The latter, in the illustrated example, are mounted upon tubular shafts 75 so as to be slidable lengthwise thereof and are fixed thereon against relative rotation in any suitable manner as by means of a key 76; the tubular shafts 75 are rotatably mounted upon rods 77 between brackets 78 and 79 which are fixed upon the rods 77 and prevent lengthwise movement of the tubular shafts 75 relatively thereto. The rods 77 in turn are supported at their outer ends in bearings 80 forming part of or secured to upright standards 81, any suitable means as, for instance, set screws 82 being provided for fastening said rods in place; the inner ends of the rods 77 are preferably mounted in collars 83 which are pivotally connected at 84 with an upright 85 and with a fork 86 secured upon the frame of the machine at the proper point. This form of pivotal connection permits the table 70 to be adjusted to positions at an angle to its normal positions, as indicated by dotted lines in Fig. 7. The standards 81 and 85 and the connection 86 are so arranged and proportioned that the table 70 is located at an inclination which is parallel with that of the shafts 29 and 32, as shown in Fig. 1, the angle of this inclination being such that the cut sections of fabric which may be deposited thereon will remain in place and will not slide downwardly on said table.

Figure 9:
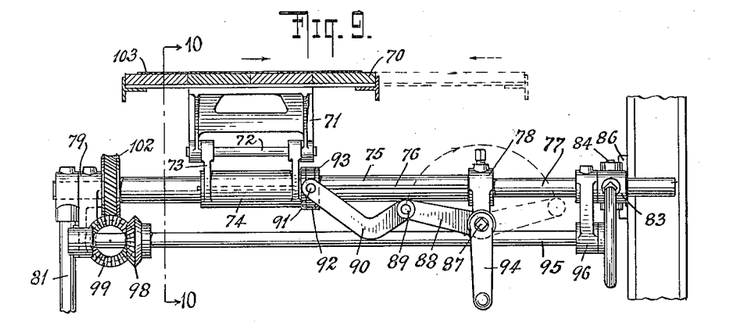
Fig. 9 is a sectional view on the line 9—9 of Fig. 1.
Figure 10:
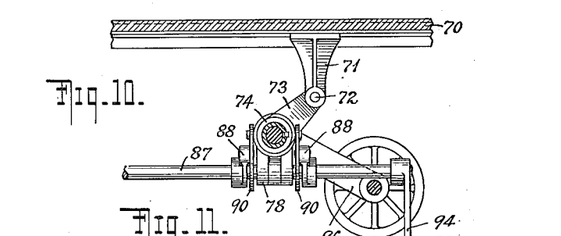
Fig. 10 is a sectional view on the line 10—10 of Fig. 9.
Figure 11:
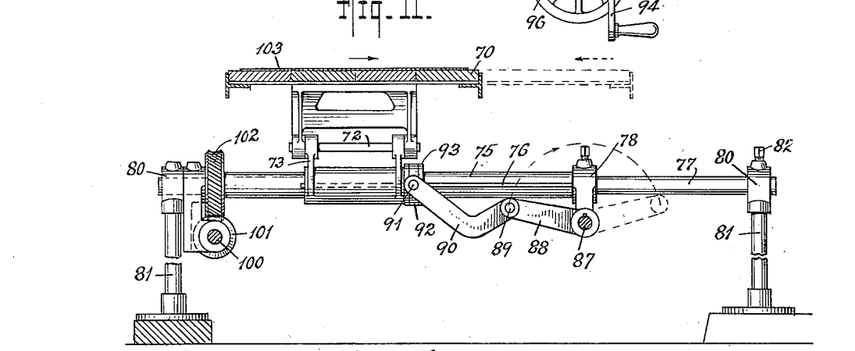
Figs. 11 and 12 are sectional views on the lines 11—11 and 12—12 respectively of Fig. 1
Figure 12:
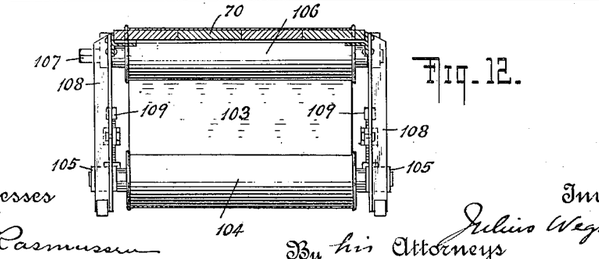

With the described and illustrated method of mounting the table, it is adjustable in directions toward and away from the take-off and also to different levels, for the purpose to be more fully described hereinafter, the adjustment being accomplished in any desired manner either automatically or manually. For instance, as shown in the illustrated example, a shaft 87 may be rotatably mounted in the brackets 78 and provided with members 88 rigidly fixed thereon and pivotally connected at 89 with one end of links 90, as shown in Figs. 9 and 11. The other ends of said links 90 are pivotally connected at 91 with rings 92 rotatably mounted in the annular grooves of heads 93 forming part of or secured to the sleeves 74. In order to facilitate the actuation of the shaft 87 in the desired manner, it may be provided at one end with an operating crank 94, it being understood that the latter is merely illustrative and that it may be replaced by equivalent and other devices. It will be apparent that by operating the crank 94, the members 88 will be caused to exert a pull or a push upon the links 90, this depending on the direction of operation, which pull or push will be transmitted to the heads 93 and sleeves 74 and thereby shift the table 70 either toward or away from the take-off. In the illustrated example the mechanism for adjusting the table 70 to different levels with respect to the take-off, comprises a shaft 95 journalled in bearings 96 carried by the shafts 77 and the brackets 79 respectively, said shaft 95 preferably being provided at one end with a hand wheel 97 or equivalent device whereby rotation of said shaft 95 is facilitated. The latter carries a bevel gear 98 which meshes with a bevel gear 99 fixed upon a countershaft 100 rotatably mounted in the brackets 79 and provided with worm gears 101 arranged to operate worm wheels 102 secured upon the tubular shafts 75.

Thus, as the hand wheel 97 or its equivalent is operated to rotate the shaft 95, the counter-shaft 100 will be similarly rotated through the medium of the bevel gears 98 and 99 and consequently will rotatably actuate the worm gears 101. The latter will transmit motion to the worm wheels 102 and thereby will rotate or rock the tubular shafts 75 upon the rods 77 and also the sleeves 74 and accordingly will swing the arms 73 in directions to either raise or lower the table 70 as the case may be.

Figure 8:
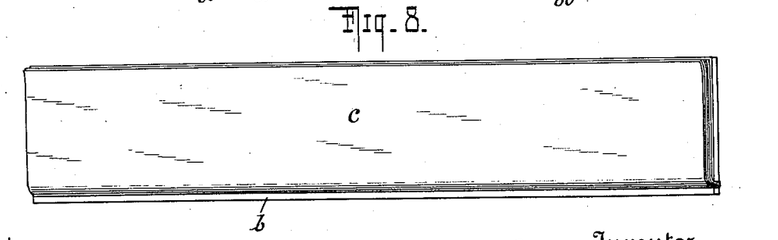
Fig. 8 is a booking device which may be used with my invention.

It will be understood that the receiving means in the form so far described is particularly adapted for booking the cut fabric in stationary stacks and that the book shown in Fig. 8 and consisting of a back $b$ and leaves $c$ of suitable material between which the cut fabric $a$ is placed may be used to carry on the booking operation. In some cases it may be desired to transfer the cut fabric lengthwise of and away from the receiving means either individually, in groups or in stacks. To effect this result, a conveyor belt 103 may be provided which passes over rollers 104 journalled in bearing blocks 105 and rollers 106 mounted in bearings 107 at the ends of the table 70, said belt having its upper rim travelling in surface engagement with the table 70, as shown in the drawings; the bearing blocks 105 may be mounted in frames 108 depending from the table 70 and preferably are adjustable in said frames, for instance, by means of adjusting screws 109 to adjust the tension of said conveyor belt 103. The latter may be automatically driven by applying power in any suitable manner to either one of the rollers 106 or said belt may be manually actuated by means of a suitable tool applied to the squared end of one of the shafts which carry said rollers 106.

Figures 3, 4, 5, 6:
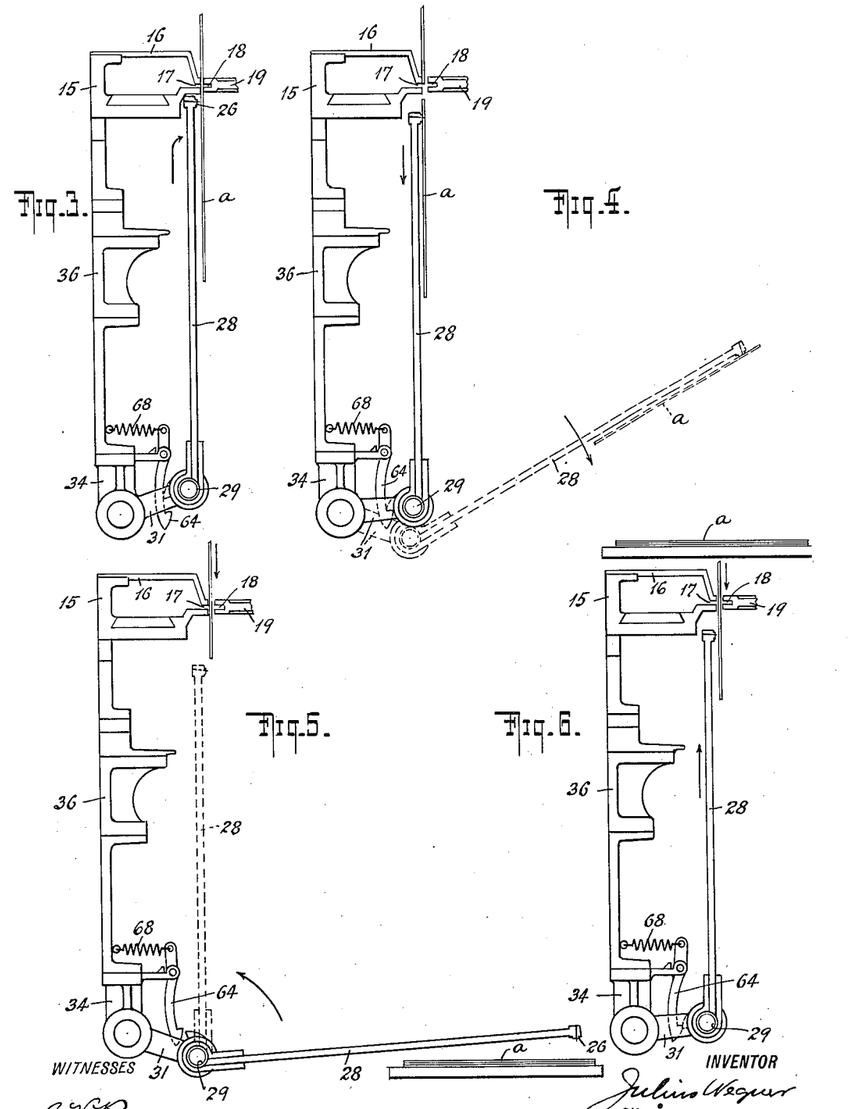
Figs. 3, 4, 5 and 6 are diagrammatic views illustrating the operation of the take-off in progresive steps.

In practice the parts of the take-off proper occupy the position shown in Figs. 2 and 3 in which the fabric $a$, after having been fed the required distance, is clamped by the clamp bar 19 against the raceway 15 and cover 16, the apertures 26 of the main tube 25 of the take-up frame being relatively near to the line along which the fabric is to be cut and in close proximity to the depending portion of said fabric $a$. As soon as the feed of the fabric $a$ has been completed and preferably coincidentally with the clamping thereof, the action of the pump 62 will cause suction to be produced in the main tube 25 which immediately becomes effective to draw the fabric $a$ against the apertures 26 and over the pins 27 where it is held. At the completion of the cut by the cutting device 23 and its knife 24 through the slot 17 the cam 49, by acting upon the roller 47, causes the arm 44 to move downwardly and thus exerts a pull upon the rod 43 which is transmitted to the lever 42 and causes it to rock the shaft 40 and lever 39 and thus exerts a pull upon the link 38. This latter pull being transmitted to the arm 37, actuates the latter and rocks the power shaft 32 and its members 31 whereby the take-off frame is given an initial, lineal movement in a downward direction and moved to the position shown in Fig. 4, so that the cut section of fabric $a$ is pulled down and away from the raceway, it being understood that the clamp bar 19 has been previously moved to an inoperative position to release said cut section of fabric. This initial, lineal movement of the take-off frame serves to release the fabric from the raceway if said fabric, because of its tackiness, should tend to adhere to the same, and at the same time brings the lug 67 into engagement with the latch 64. As the rocking of the shaft 32 is continued, the latch 64, being stationary, will exert a restraining force upon the lug 67 and thereby rock the tubular shaft 29 in the members 31 and as a result swing the take-off frame and with it the cut section of fabric $a$ to the position shown by dotted lines in Fig. 4 and finally to the position illustrated in Fig. 5 in which the stock is in registry with the receiving table 70. The downward movement of the take-off frame is rather swift as a result of which the impact of the lug 67 against the latch 64 is such as to impart a momentum to said take-off frame in a circular path sufficient to carry it to the position shown in Fig. 5. When the tubular shaft 29 has been rocked to a point at which the latch 64 no longer exerts a restraining effect upon the lug 67, the aforesaid momentum plus the weight of the take-off frame and that of the cut section of fabric a will be sufficient to overcome the tension of the spring 33 and will thereby complete the pivotal movement of said take-off frame, which movement is opposed by said spring 33. Furthermore, during the described pivotal movement of the take-off frame the wire netting 30 will prevent the air pressure from forcing the cut section of fabric a into the spaces between the branch tubes 28 so that said cut section is carried in a substantially flat condition to the receiving table 70. At the moment when the take-off frame reaches the position shown in Fig. 5, the action of the suction pump 62 from the tube 25 is automatically discontinued in any suitable manner whereby the suction in said tube 25 is relieved and the cut section of fabric a is released and deposited upon the receiving table 70. As soon as the take-off frame is relieved of the weight of the cut section of fabric a, said frame will be swung back through a return path by the action of the spring 33, the latch 64 being above the path of the lug 67 at this stage and offering no interference to this movement, and will reach an upright position back of the path of the fabric before the latter is again fed downward and clamped. The operation of the cam 49 upon the roller 47, arm 40, levers 42 and 39 and link 38 causes the power shaft 32 to be rocked in a return direction and the take-off frame to be restored to its initial position, as shown in Fig. 3, in which the suction is again effective in the tube 25 and in which the lug 67 is again above the latch 64. The previously described operation is repeated and successive cut sections of fabric a are removed from the cutting machine in continuous sequence.

If the cut fabric a is to be booked, the device shown in Fig. 8 may be placed upon the table 70 and successive sections of said fabric deposited between the leaves c thereof, the latter serving to separate said cut fabric sections and to prevent them from sticking together; it will be obvious that the cut fabric sections may be stacked directly upon said table 70. If the belt 103 is included in the construction, the booking device b may be placed thereon or said sections of fabric may be directly stacked thereon, said belt in either case being stationary during the booking operation. As the latter progresses, the table 70 and with it the belt 103, if part of the structure, is gradually caused to move downwardly by actuating the hand wheel 97 manually or by providing an equivalent actuation of the shaft 95 automatically in any suitable way. In any case, the tubular shafts 75 and sleeves 74 will be rocked through the medium of the worm gearing 101 and 102 and will swing the arms 73 in directions to position the uppermost section of fabric a in a plane to properly receive the next succeeding cut section of fabric a; the receiving capacity of the table and the efficiency of the take-off as a booking device is thereby materially increased. At the same time, with the described arrangement, the receiving means or more specifically the table 70, by being adjustable as described, maintains a substantially fixed plane of deposit so that the suction release to relieve the suction in the tube 25 may take place at the same instant in successive operations.

The table 70 and its co-ordinated parts may be adjusted toward and away from the booking device by properly actuating the crank 94, thus making it possible, if desired, to stack the cut fabric in a plurality of books located alongside of each other. After the booking has been completed, the conveyor belt 103 may be manually or mechanically operated to convey the book or books away and to make room for the stacking of successive books, it being understood that the completed books may be manually removed from the belt 103 or transferred thereby to another conveyor or to any other suitable device.

When the fabric is cut on the bias, it is generally preferred to make the cut at an angle of 45° to the length of the fabric; as this angle, if followed in the table 70, provides an inclination upon which it is difficult to maintain the cut sections of fabric a without slipping, it is preferred to arrange said table 70 at an angle of inclination wherein this tendency to slip is overcome, as shown in the drawings. This results, however, in depositing the cut fabric sections a upon the table 70 or belt 103 in positions at angles to the length thereof instead of parallel therewith; this is of no consequence if only a single book or section of fabric or two adjacent books or sections of fabric are to be deposited. If, however, a series of books or a series of sections of fabric a are to be deposited in contiguous relation to each other, it is desirable to adjust the table 70 and its associated elements, for instance, to the position indicated by dotted lines in Fig. 7 in which it will extend in parallel relation to the tube 25 when the take-off is in the position of discharge shown in Fig. 5. This is readily possible because of the swivelled or pivoted connections 84.

Figure 7:
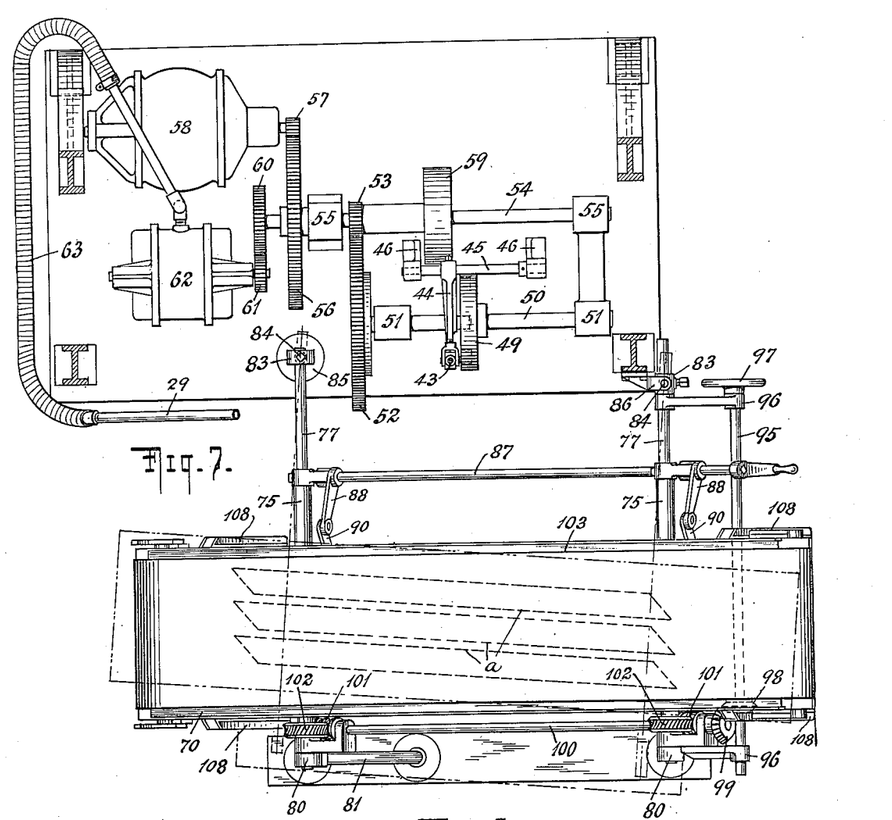
Fig. 7 is a plan view of the receiving means and associated elements, certain parts being in section.

The sections of cut fabric a, when arranged as in Fig. 7, utilize the maximum capacity of the table 70 or belt 103 with respect to width and, generally speaking, are wound upon a storage roll of suitable type between a strip of material such as linen or the like, it being of course understood that the stacking or booking operation may also be carried out with the parts adjusted to the dotted position of Fig. 7.

The take-off and receiving means are extremely simple in construction and operation and automatically or otherwise removes the sections of fabric as soon as the same have been cut, thus not only doing away with the necessity for manually performing this operation but also materially increasing the capacity of the cutting machine. The take-off and the receiving means, either individually or collectively, are capable of being readily combined with existing cutting machines without requiring any extensive alterations or changes therein.

Various changes in the form shown and described may be made within the scope of the claims without departing from the spirit of my invention.

I claim:

1. The combination of a cutting mechanism for cutting material into successive sections, a pivotally movable device for removing the cut sections of material, means for positively actuating said device throughout the beginning of its pivotal movement, the latter being brought to completion by momentum and gravity and means for effecting a return of said device to its initial position independently of said first means.

2. The combination of a cutting mechanism for cutting material into successive sections, a device for removing the cut sections of material, said device having an initial lineal movement and a subsequent pivotal movement out of the plane of said lineal movement, means for mechanically actuating said device throughout the beginning of said pivotal movement, the latter being brought to completion by momentum and gravity and a spring for effecting a return of said device to its initial position independently of said means.

3. In a fabric cutting machine, a raceway, clamping means for clamping the fabric against said raceway, cutting mechanism whereby said fabric is cut to form a separate section depending from said raceway and a suction take-off whereby said cut depending section of fabric is automatically first pulled away from said cutting mechanism and then transferred from said machine.

4. In a fabric cutting machine including means whereby the fabric is intermittently fed and means whereby said fabric is cut into successive sections, a pivoted take-off frame, means for producing suction in said frame whereby said fabric is held beyond the line of cut, and mechanism whereby said take-off frame is pivotally actuated to automatically remove said cut sections from said machine in individual succession.

5. In a fabric cutting machine including cutting means whereby said fabric is cut into successive sections and clamping means for clamping said fabric while the latter is being cut, a power shaft, a tubular shaft rotatably carried by said power shaft, branch tubes carried by and connected with said tubular shaft, an apertured main tube carried by and connected with said branch tubes and together therewith constituting a take-off frame, suction producing means connected with said tubular shaft to produce suction in said main tube and at its apertures whereby said cut sections of fabric are held, mechanism for rocking said power shaft to linearly move said take-off frame whereby said cut section of fabric is pulled away from said cutting means and means whereby said tubular shaft is rocked to pivotally swing said take-off frame and thereby automatically remove said cut section of fabric from the machine.

6. In a fabric cutting machine including cutting means whereby said fabric is cut into successive sections and clamping means for clamping said fabric while the latter is being cut, a power shaft, a tubular shaft rotatably carried by said power shaft, branch tubes carried by and connected with said tubular shaft, an apertured main tube carried by and connected with said branch tubes and together therewith constituting a take-off frame, suction producing means connected with said tubular shaft to produce suction in said main tube and at its apertures whereby said cut sections of fabric are held, mechanism for rocking said power shaft to linearly move said take-off frame whereby said cut section of fabric is pulled away from said cutting means, a lug fixed upon said tubular shaft and a latch in the path of said lug and exerting a restraining effect thereon as said power shaft is rocked whereby said tubular shaft is independently rocked to pivotally swing said take-off frame and thereby automatically remove said cut section of fabric from the machine.

7. The combination of cutting means whereby a fabric is cut into successive sections, clamping means whereby said fabric is clamped during the cutting thereof and a take-off having an initial lineal movement to first pull the cut section from said cutting means and a subsequent pivotal movement to automatically remove the cut section of fabric from the machine.

8. The combination of cutting means whereby a fabric is cut into successive sections, clamping means whereby said fabric is clamped during the cutting thereof, a take-off having an initial lineal movement to first pull the cut section from said cutting mechanism and a subsequent pivotal movement to automatically remove the cut section of fabric from the machine and a spring for reversing said subsequent pivotal movement after said cut section has been removed.

9. The combination of cutting means whereby a fabric is cut into successive sections, clamping means whereby said fabric is clamped during the cutting thereof, a take-off having an initial lineal movement to first pull the cut section from said cutting mechanism and a subsequent pivotal movement to automatically remove the cut section of fabric from the machine, a table upon which said cut sections are successively deposited and means whereby said table is adjusted to accommodate the gradually increasing pile of cut sections.

10. The combination of cutting means whereby a fabric is cut into successive sections, clamping means whereby said fabric is clamped during the cutting thereof, a suction take-off whereby said cut section is held and pins arranged to augment the suction in holding said sections, said take-off having an initial lineal movement to first pull the cut section from said cutting means and a subsequent pivotal movement to automatically remove said cut sections of fabric from the machine.

11. In a fabric cutting machine including cutting means whereby said fabric is cut into successive sections and clamping means for clamping said fabric while the latter is being cut, a power shaft, a tubular shaft rotatably carried by said power shaft, branch tubes carried by and connected with said tubular shaft, an apertured main tube carried by and connected with said branch tubes and together therewith constituting a take-off frame, suction producing means connected with said tubular shaft to produce suction in said main tube and at its apertures whereby said cut sections of fabric are held, pins carried by said main tube and projecting outwardly through its apertures to augment the suction in holding said cut sections and means for giving said take-off an initial lineal movement to pull said cut section of fabric away from said cutting mechanism and a subsequent pivotal movement to automatically remove said cut section of fabric from the machine.

12. In a fabric cutting machine, the combination of an automatic take-off whereby the cut sections of fabric are removed from the machine, a supporting frame, a table upon which said cut sections of fabric are deposited by said take-off, means whereby said table is slidably and adjustably mounted upon said frame, mechanism for slidably adjusting said means to shift said table toward and away from said take-off and mechanism for operating said means to progressively adjust said table to maintain a substantially fixed plane of deposit.

13. In a fabric cutting machine, the combination of an automatic take-off whereby the cut sections of fabric are removed from the machine, a supporting frame, a table upon which said cut sections of fabric are deposited by said take-off, means whereby said table is slidably and adjustably mounted upon said frame, mechanism for slidably adjusting said means to shift said table toward and away from said take-off, mechanism for operating said means to progressively adjust said table to maintain a substantially fixed plane of deposit and a conveyor belt having its one rim arranged to travel in surface engagement with said table.

14. In a fabric cutting machine, the combination of an automatic take-off whereby the cut sections of fabric are removed from the machine, a supporting frame pivotally connected with said machine and including parallel guide rods, tubular shafts rotatably mounted upon said rods, sleeves slidably mounted upon said tubular shafts and keyed thereon to rotate with said shafts, arms fixed upon said sleeves, brackets pivotally connected with said arms, a table carried by said brackets and arranged to receive the sections of cut fabric from the take-off, bearings secured upon said rods, an adjusting shaft journalled in said bearings, members carried by said adjusting shaft, links connecting said members with said sleeves, means for actuating said adjusting shaft to shift said table toward and away from said take-off, additional bearings fixed upon said rods, a second adjusting shaft journalled in said additional bearings, gearing mounted respectively on said second adjusting shafts and said tubular shafts to operatively connect the same and means for actuating said second adjusting shaft to rotate said tubular shafts and sleeves whereby said table is progressively adjusted to maintain a substantially fixed plane of deposit.

In testimony whereof I have hereunto set my hand.

JULIUS WEGNER.